United States Patent
da Silva et al.

(10) Patent No.: US 11,693,922 B2
(45) Date of Patent: Jul. 4, 2023

(54) METHOD AND SYSTEM FOR A FAST ADAPTATION FOR IMAGE SEGMENTATION FOR AUTONOMOUS EDGE VEHICLES

(71) Applicant: EMC IP Holding Company LLC, Hopkinton, MA (US)

(72) Inventors: Pablo Nascimento da Silva, Niterói (BR); Hugo de Oliveira Barbalho, Rio de Janeiro (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 252 days.

(21) Appl. No.: 17/199,583

(22) Filed: Mar. 12, 2021

(65) Prior Publication Data
US 2022/0292310 A1 Sep. 15, 2022

(51) Int. Cl.
| | |
|---|---|
| G06F 16/00 | (2019.01) |
| G06F 18/214 | (2023.01) |
| G06F 16/55 | (2019.01) |
| G06N 3/08 | (2023.01) |
| G06N 3/04 | (2023.01) |
| G06F 18/24 | (2023.01) |
| G06F 18/21 | (2023.01) |
| G06F 16/65 | (2019.01) |
| G06V 20/56 | (2022.01) |

(52) U.S. Cl.
CPC .......... *G06F 18/2148* (2023.01); *G06F 16/55* (2019.01); *G06F 16/65* (2019.01); *G06F 18/2163* (2023.01); *G06F 18/24* (2023.01); *G06N 3/04* (2013.01); *G06N 3/08* (2013.01); *G06V 20/56* (2022.01)

(58) Field of Classification Search
CPC ...................................................... G06F 16/65
See application file for complete search history.

(56) References Cited

U.S. PATENT DOCUMENTS

2014/0037142 A1* 2/2014 Bhanu .................... G06V 20/54
382/103

* cited by examiner

*Primary Examiner* — Ajith Jacob
(74) *Attorney, Agent, or Firm* — Chamberlain, Hrdlicka, White, Williams & Aughtry (57) ABSTRACT

A method includes obtaining, by a local data system manager of a local data system of the local data systems, a portion of unlabeled data from a local data source, performing, using a domain classifier in the local data system manager, a domain classification analysis on the portion of the unlabeled data to identify a domain of the unlabeled data, making a first determination, based on the domain classification, that the domain classification has significantly varied from a previous domain, based on the first determination: performing an adaptive procedure on a local data system image segmentation model to obtain an adapted image segmentation model, and performing a domain reclassification on the domain classifier to obtain an updated domain classifier, and implementing the adapted image segmentation model on the local data system.

20 Claims, 8 Drawing Sheets

METHOD AND SYSTEM FOR A FAST
ADAPTATION FOR IMAGE SEGMENTATION
FOR AUTONOMOUS EDGE VEHICLES

BACKGROUND

Systems may include multiple computing devices. Each computing device may include computing resources. The computing resources may be used to implement generated models. The update of the generated models may incur some degree of latency and loss of accuracy.

SUMMARY

In general, in one aspect, the invention relates to a method for managing local data systems. The method includes obtaining, by a local data system manager of a local data system of the local data systems, a portion of unlabeled data from a local data source, performing, using a domain classifier in the local data system manager, a domain classification analysis on the portion of the unlabeled data to identify a domain of the unlabeled data, making a first determination, based on the domain classification, that the domain classification has significantly varied from a previous domain, based on the first determination: performing an adaptive procedure on a local data system image segmentation model to obtain an adapted image segmentation model, and performing a domain reclassification on the domain classifier to obtain an updated domain classifier, and implementing the adapted image segmentation model on the local data system.

In general, in one aspect, the invention relates to a non-transitory computer readable medium comprising computer readable program code, which when executed by a computer processor enables the computer processor to perform a method for managing local data systems. The method includes obtaining, by a local data system manager of a local data system of the local data systems, a portion of unlabeled data from a local data source, performing, using a domain classifier in the local data system manager, a domain classification analysis on the portion of the unlabeled data to identify a domain of the unlabeled data, making a first determination, based on the domain classification, that the domain classification has significantly varied from a previous domain, based on the first determination: performing an adaptive procedure on a local data system image segmentation model to obtain an adapted image segmentation model, and performing a domain reclassification on the domain classifier to obtain an updated domain classifier, and implementing the adapted image segmentation model on the local data system.

In general, in one aspect, the invention relates to a system that includes an image segmentation manager, a local data system, and memory that includes instructions, which when executed by the local data system, perform a method. The method includes obtaining, by a local data system manager of a local data system of the local data systems, a portion of unlabeled data from a local data source, performing, using a domain classifier in the local data system manager, a domain classification analysis on the portion of the unlabeled data to identify a domain of the unlabeled data, making a first determination, based on the domain classification, that the domain classification has significantly varied from a previous domain, based on the first determination: performing an adaptive procedure on a local data system image segmentation model to obtain an adapted image segmentation model, and performing a domain reclassification on the domain classifier to obtain an updated domain classifier, and implementing the adapted image segmentation model on the local data system.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing local data systems. Specifically, embodiments of the invention relate to a method of enabling a fast adaptation and implementation of an image segmentation model executing on a local data system. The local data system (e.g., an autonomous vehicle edge device) may initially execute a base model obtained from an image segmentation manager (e.g., implemented using a cloud service). The base model may be generated using an initial set of labeled and unlabeled training dataset. The initial set of labeled and unlabeled training dataset may correspond to an initial domain.

In one or more embodiments, as a local data system continues operation, the domain of operation may change. As such, obtained images by the local data system may correspond to a varied domain. As a variance reaches a level of significance, the local data system monitoring the domain of the obtained images may initiate an adaptation of the image segmentation model. The adaptation may include using a modified version of domain adaptation neural networks (DANN).

Figure 1A:
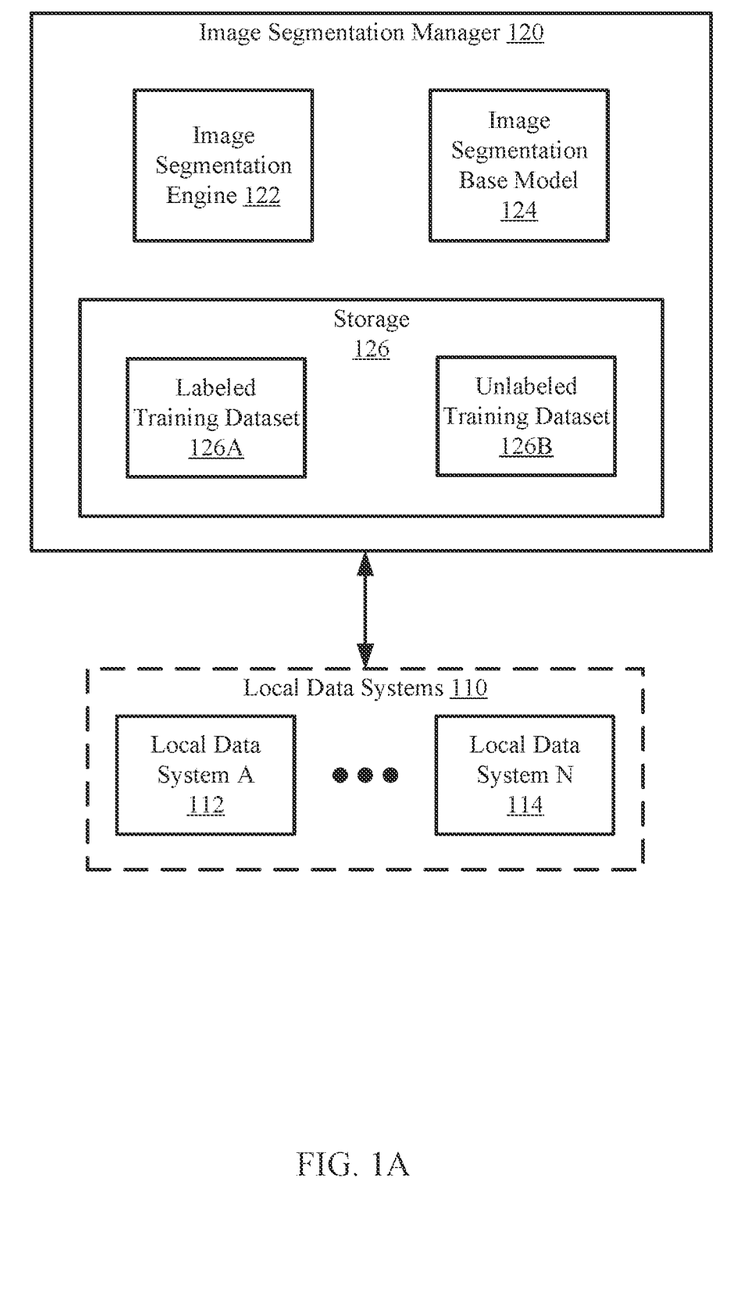
FIG. 1A shows a diagram of a system in accordance with one or more embodiments of the invention.

FIG. 1A shows a diagram of a system in accordance with one or more embodiments of the invention. The system includes an image segmentation manager (120) and one or more local data systems (110). Each component of the system may be operably connected via any combination of wired and/or wireless connections. The system may include additional, fewer, and/or different components without departing from the invention. Each component of the system illustrated in FIG. 1A is discussed below.

In one or more embodiments of the invention, the image segmentation manager (120) provides image segmentation services. The image segmentation services may include, for example, generating an image segmentation base model (124) and providing the image segmentation base model to a set of local data systems (112, 114). The image segmentation base model (124) may be based on a neural network. In order to perform the aforementioned functionality, the image segmentation manager (120) includes an image segmentation engine (122) and storage (126). The image segmentation manager (120) may include additional, fewer, and/or different components without departing from the invention. Each component of the image segmentation manager (120) illustrated in FIG. 1A is discussed below.

In one or more embodiments of the invention, the image segmentation engine (122) generates the image segmentation base model (124). In one or more embodiments of the invention, the image segmentation base model (124) is generated using the labeled training dataset (126A) and the unlabeled training dataset (126B). The image segmentation engine (122) may perform a neural network algorithm in accordance with FIG. 2A using the labeled training dataset (126A) and the unlabeled training dataset (126B).

In one or more embodiments of the invention, the storage (126) stores the labeled training dataset (126A) and the unlabeled training dataset (126B). The labeled training dataset (126A) may include a set of data items used for training a machine learning algorithm. The data items may be, for example, images. The images may be labeled with individual objects in the images. The individual objects may be used in conjunction with the unlabeled training data set (126B) for training the base model (124).

Figure 4:
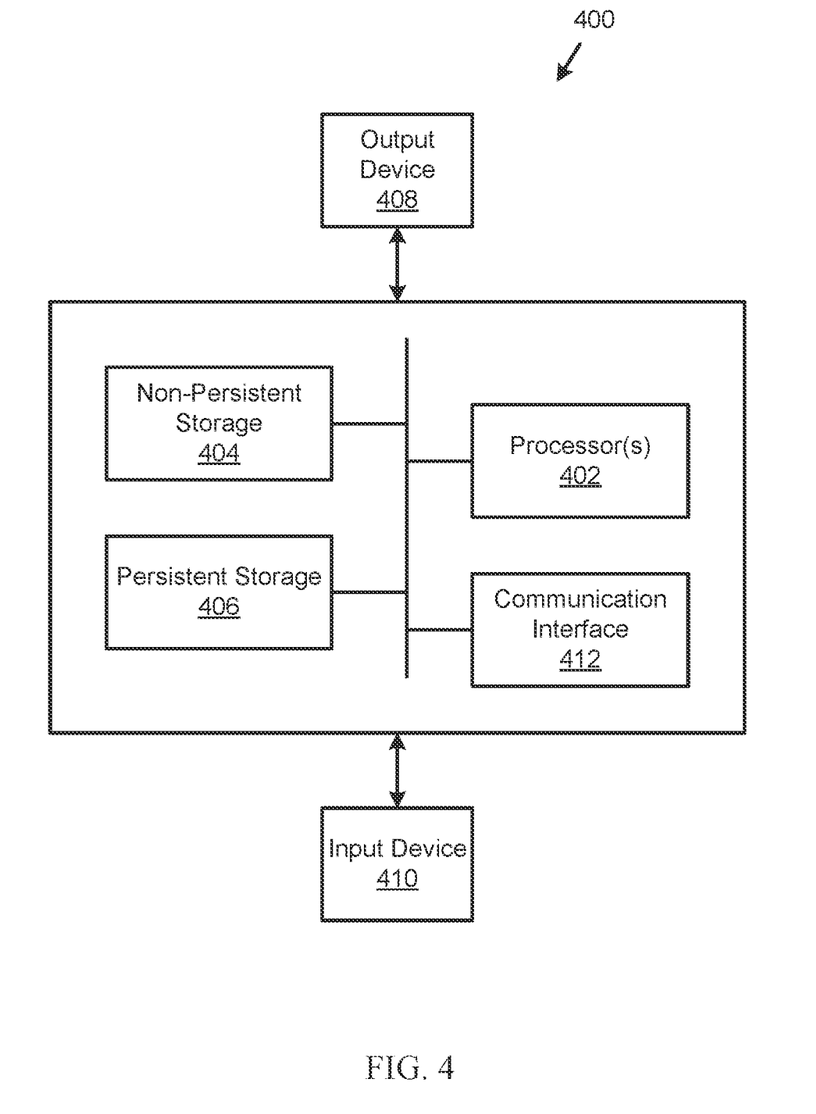
FIG. 4 shows a diagram of a computing device in accordance with one or more embodiments of the invention.

In one or more embodiments of the invention, the image segmentation manager (120) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the image segmentation manager (120) described throughout this application and/or all, or portion, of the method illustrated in FIG. 2A.

In one or more embodiments of the invention, the image segmentation manager (120) is implemented as a logical device. The logical device may utilize computing resources of any number of physical computing devices to provide the functionality of the image segmentation manager (120) described throughout this application.

In one or more embodiments of the invention, the local data systems (110) are devices accessible, at least in part, to the image segmentation manager (120). The local data systems (112, 114) may each execute an image segmentation model. The image segmentation model may be, at least initially, the image segmentation base model (124) generated by the image segmentation engine (122) and distributed to the local data systems (110) in accordance with FIG. 2A.

In one or more embodiments of the invention, the local data systems (110) are implemented as vehicle edge devices. The vehicle edge devices may capture images during operation (e.g., while driving). Further, the vehicle edge devices may include functionality for operating autonomously (e.g., self-driving). The vehicle edge devices may operate autonomously using the image segmentation model. For additional details regarding the local data systems (110), see, e.g., FIG. 1B.

The invention is not limited to the architecture shown in FIG. 1A.

Figure 1B:
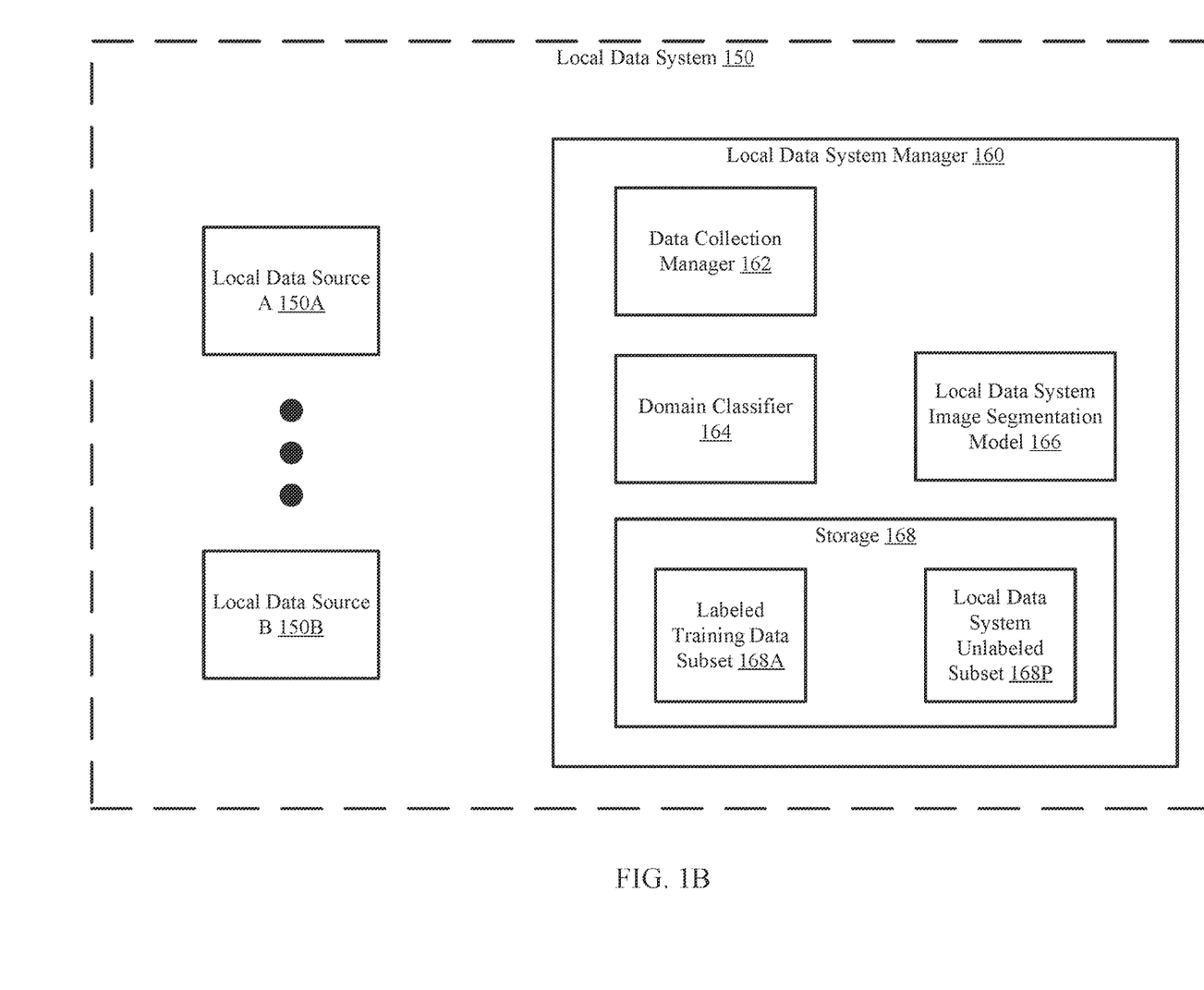
FIG. 1B shows a diagram of a local data system in accordance with one or more embodiments of the invention.

FIG. 1B shows a diagram of a local data system (150) in accordance with one or more embodiments of the invention. The local data system (150) may be an embodiment of a local data system (112, 114, FIG. 1A) discussed above. As discussed above, the local data system (150) includes functionality for executing a local data system image segmentation model (166) during operation. Further, the local data system (150) includes functionality for monitoring obtained data to detect a change in domain (further discussed in FIG. 2B).

To perform the aforementioned functionality, the local data system (150) includes a set of local data sources (150A, 150B) and a local data system manager (160). The local data system (150) may include additional, fewer, and/or different components without departing from the invention. Each of the aforementioned components is discussed below.

In one or more embodiments of the invention, the local data sources (150A, 150B) are sources of data obtained from real-world processes. A local data source may be, for example, a camera. The data may be, for example, images captured by the camera. The camera may be a hardware device for capturing images during the operation of the local data system (150). Further, the local data sources (150A, 150B) may be, for example, sensors. For example, the sensor may be a distance sensor. The distance sensor may detect the distance of objects relative to the local data system (150) during operation.

In one or more embodiments of the invention, the local data system manager (160) includes functionality for monitoring data obtained from the local data sources (150A, 150B) and implementing a local data system image segmentation model (166). To perform the aforementioned functionality, the local data system manager (160) includes a data collection manager (162), a domain classifier (164), the local data system image segmentation model (166), and storage (168). The local data system manager (160) may include additional, fewer, and/or different components without departing from the invention.

In one or more embodiments of the invention, the data collection manager (162) collects the data obtained from the local data sources (150A, 150B) and provides it to the domain classifier (164) for additional analysis. Further, the data collection manager (162) may implement the local data system image segmentation model (166) using the obtained data. The implementation of the local data system image segmentation model (166) may include detecting (or otherwise discerning) objects in images obtained from the local data sources (150A, 150B). The detected objects may be used for operation of the local data system.

For example, during operation of the local data system, the local data system may be driving along a road. The local data sources (150A, 150B) may capture images of its surroundings. The captured images may be processed via the local data system image segmentation model (166) to detect objects nearby (e.g., the road). The local data system (150), after detection of such images, may continue driving while staying within the boundaries of the detected road and while avoiding collision with any additional detected objects (e.g., other cars).

While not illustrated in FIG. 1B, the local data system (150) may include additional components to enable the operation of an autonomous vehicle. Examples of the additional components include, but are not limited to: an engine, a transmission, axles, and wheels attached to the axles.

In one or more embodiments of the invention, the data collection manager (162) is a hardware device including circuitry. The data collection manager (162) may be, for example, a digital signal processor, a field programmable gate array, or an application specific integrated circuit. The data collection manager (162) may be other types of hardware devices without departing from the invention.

In one or more embodiments of the invention, the data collection manager (162) is implemented as computing code stored on a persistent storage that when executed by a processor of the data collection manager (162) performs the functionality of the data collection manager (162). The processor may be a hardware processor including circuitry such as, for example, a central processing unit or a microcontroller. The processor may be other types of hardware devices for processing digital information without departing from the invention.

In one or more embodiments of the invention, the domain classifier (164) is a component that monitors the data. The monitoring may include performing a domain classification analysis in accordance with FIG. 2A.

In one or more embodiments of the invention, the domain classifier (164) is a hardware device including circuitry. The domain classifier (164) may be, for example, a digital signal processor, a field programmable gate array, or an application specific integrated circuit. The domain classifier (164) may be other types of hardware devices without departing from the invention.

In one or more embodiments of the invention, the domain classifier (164) is implemented as computing code stored on a persistent storage that when executed by a processor of the domain classifier (164) performs the functionality of the domain classifier (164) discussed throughout the application. The processor may be a hardware processor including circuitry such as, for example, a central processing unit or a microcontroller. The processor may be other types of hardware devices for processing digital information without departing from the invention.

In one or more embodiments of the invention, the local data system image segmentation model (166) is a model generated by implementing a machine learning algorithm. The model may obtain inputs (e.g., images) and provide an output that includes labeled images that detect objects and/or other characteristics in the obtained inputs.

In one or more embodiments of the invention, the local data system image segmentation model (166) is initially implemented as the base model generated by an image segmentation manager (discussed above). During operation of the local data system (150), the local data system image segmentation model (166) may be updated based on an adaptation of the domain (discussed in FIG. 2B). The result may be an adapted local data image system image segmentation model.

In one or more embodiments of the invention, the storage (168) of the local data system (150) includes a subset of labeled training data (168A) and a subset of local data system unlabeled data (168P). The labeled training data subset (168A) may be a subset of the labeled training data set stored in the image segmentation manager. The local data system unlabeled subset (168P) may be data obtained from the local data source (150A, 150B). The storage (168) may include additional, fewer, and/or different data structures without departing from the invention.

The invention may be implemented using other local data system resources without departing from the invention.

Figure 2A:
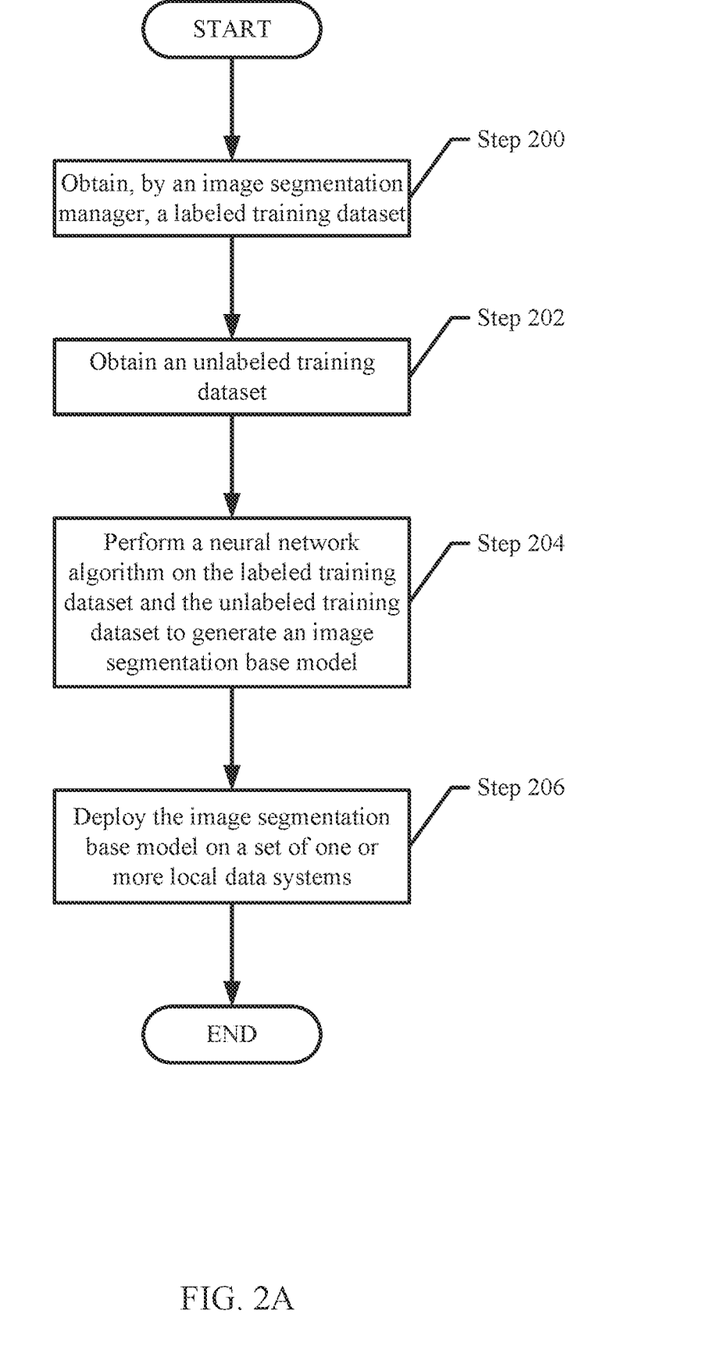
FIG. 2A shows a flowchart for deploying an image segmentation base model in accordance with one or more embodiments of the invention.
Figure 2B:
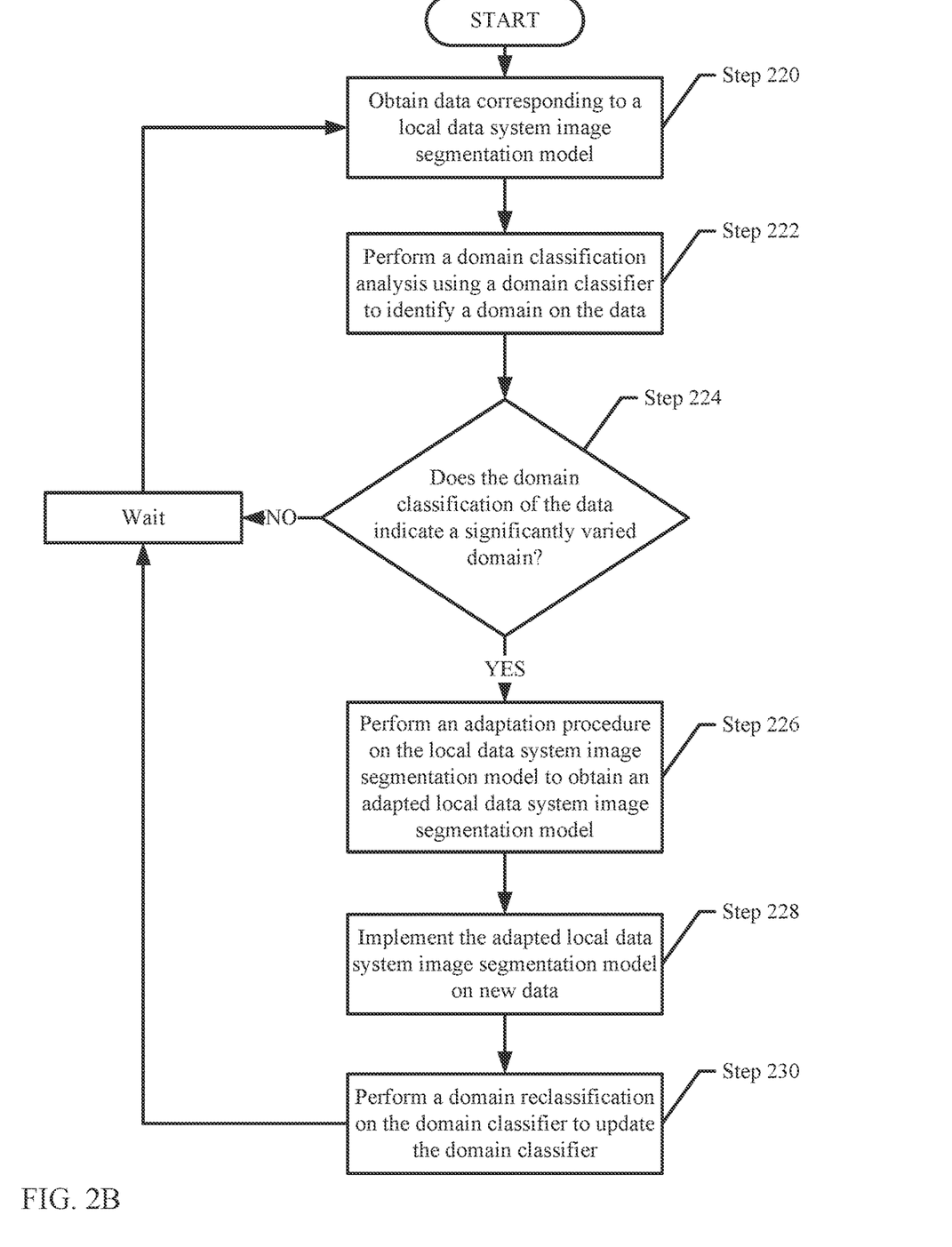
FIG. 2B shows a flowchart for performing an image segmentation adaptation in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for deploying an image segmentation base model in accordance with one or more embodiments of the invention. The method shown in FIG. 2A may be performed by, for example, an image segmentation manager (e.g., 120, FIG. 1A). Other components of the system illustrated in FIG. 1A may perform the method of FIG. 2A without departing from the invention.

Turning to FIG. 2A, in step 200, a labeled training dataset may be obtained by the image segmentation manager. In one or more embodiments of the invention, the labeled training dataset may be obtained from an administrator, or any other entity managing the generation of the image segmentation model. As discussed above, the labeled training data set may include a number of data items (e.g., images) that are labeled with objects in the images.

In step 202, an unlabeled training data set is obtained. Similar to the labeled training dataset, the unlabeled training dataset may be obtained from an administrator, or any other entity managing the generation of the image segmentation model. In contrast to the labeled training dataset, the data items of the unlabeled training dataset is not labeled with objects.

In step 204, a neural network algorithm is performed on the labeled training dataset and the unlabeled training dataset to generate an image segmentation base model. In one or more embodiments of the invention, the neural network algorithm performed on the two datasets is a process of processing the data items in the two datasets using a network topology configured by the administrator (or other entity).

In one or more embodiments of the invention, the neural network algorithm performed on the two datasets is a convolutional neural network (CNN). In one or more embodiments of the invention, a CNN is a deep neural network algorithm that includes extracting features from the training dataset (which may include the labeled and unlabeled training datasets), filtering out, in one or more iterations, undesirable noise in a set of data items, and implementing a loss layer for determining a deviation between a predicted output and the true labels. As both labeled and unlabeled data items are used during one or more iterations of the training, the CNN outputs an image segmentation base model that varies in accuracy and prediction time based on the number of iterations. The image segmentation base model may be used to detect objects in an unlabeled image input to the image segmentation base model.

In step 206, the image segmentation base model is deployed to a set of one or more local data systems. In one or more embodiments of the invention, the set of local data systems to which the image segmentation base model is deployed is based on whether the local data system requests the image segmentation base model. Alternatively, the set of local data systems may be determined by the aforementioned administrator (or other entity). The set of local data systems to which the image segmentation base model may be determined by other mechanisms without departing from the invention.

FIG. 2B shows a flowchart for performing an image segmentation adaptation in accordance with one or more embodiments of the invention. The method shown in FIG. 2B may be performed by, for example, a local data system (e.g., 150, FIG. 1B). Other components of the system illustrated in FIG. 1A or FIG. 1B may perform the method of FIG. 2B without departing from the invention.

In step 220, data corresponding to a local data system image segmentation model is obtained. In one or more embodiments of the invention, the data is obtained from local data sources of the local data system. For example, the data may be images provided from a video stream obtained from a video camera operating on the local data system.

In step 222, a domain classification analysis is performed to identify a domain on the data. In one or more embodiments of the invention, a domain is an overall classification of a type of environment corresponding to a data item (e.g., an image). The domain corresponding to an image may be impacted by a combination of factors such as, for example: a road type in the image, weather conditions, number of buildings near the road, a location of the image, and size of the buildings. Other factors may impact the domain of an image without departing from the invention. The image segmentation model implemented by the local data system may correspond to a first domain.

In one or more embodiments of the invention, the domain classification analysis may include comparing a domain of the obtained data classified using the domain classification, and comparing the classified domain to the first domain of the image segmentation model. Each domain may correspond to a set of numerical values. The numerical values may be compared to identify a variance of the two domains. A significant variance may correspond to a variance that has reached and/or exceeded a predefined threshold.

In step 224, a determination is made about whether the domain classification of the data indicates a significantly varied domain. If the domain classification of the data indicates a significantly varied domain, the method proceeds to step 226; otherwise, the method proceeds to wait for a predetermined amount of time prior to proceeding to step 220.

In step 226, an adaptation procedure is performed on the local data system image segmentation model to obtain an adapted local data system image segmentation model. In one or more embodiments of the invention, the adaption procedure includes performing a modified version of the neural network algorithm performed in FIG. 2A.

In one or more embodiments of the invention, the modified version of the neural network is a domain adaptation neural network (DANN). The DANN is an algorithm performed that reduces the value of the labeled training dataset (due to the significant variation of the images in the labeled training dataset relative to the current domain of the new images). The DANN utilizes a batch selection, modified feature extraction, a label prediction mechanism, and the domain classifier.

In one or more embodiments of the invention, the batch selection includes obtaining a portion of the labeled training dataset from the image segmentation manager and dividing such portion into groups of labeled data. Further, the obtained data of step 220 is divided into groups of unlabeled data. The groups of labeled data and the groups of unlabeled data may be selected into batches. The batches may be generated randomly. In other words the selection of each group of either labeled or unlabeled data to a batch may be performed randomly.

Following the batch selection, a sampling ratio may be utilized to determine an amount of data to be used for training. In one or more embodiments of the invention, the sampling ratio is a ratio of unlabeled data for each batch to be used for the training. A higher sampling ratio increases the computation time during training, and thus increasing the total time performed during the adaptation procedure. Further, a higher sampling ratio may increase an accuracy of the resulting adapted image segmentation model. An initial sampling ratio may be pre-determined by the administrator.

Using the sampling ratio, a decay ratio is measured using a loss function applied to the data with the initial sampling ratio. In one or more embodiments of the invention, a decay ratio is a rate of the sampling ratio over several iterations. The loss function may be a measurement of an inaccuracy of the label prediction mechanism and the domain classifier as a function of the sampled data and a set of machine learning parameters. The decay ratio may be measured using a rate of change of loss over a number of iterations.

In one or more embodiments of the invention, the DANN further includes optimizing a number of layers frozen during the neural network feature extraction phase of the training. In one or more embodiments of the invention, the freezing of the number of layers includes reducing the number of layers to be used during the feature extraction. The accuracy and computation time may each be impacted based on the number of frozen layers. For example, a trend of decreasing accuracy and decreasing computation time may occur as the number of frozen layers increases. Embodiments of the invention may include selecting an optimal number of layers to freeze that reduces computation time while minimizing loss of accuracy.

In one or more embodiments of the invention, performing the training using the modified feature extraction and based on a sampling ratio results in an adapted local data system image segmentation model.

In step 228, the adapted local data system image segmentation model is implemented. In one or more embodiments of the invention, the adapted local data system image segmentation model replaces the previous image segmentation model.

In step 330, a domain reclassification is performed on the domain classifier to update the domain classifier. In one or more embodiments of the invention, the domain reclassification includes reclassifying the images used to train the adapted local data system image segmentation model to generate a new domain to be used during the domain classification analysis for new incoming data.

Example

The following section describes an example. The example, illustrated in

Figure 3A:
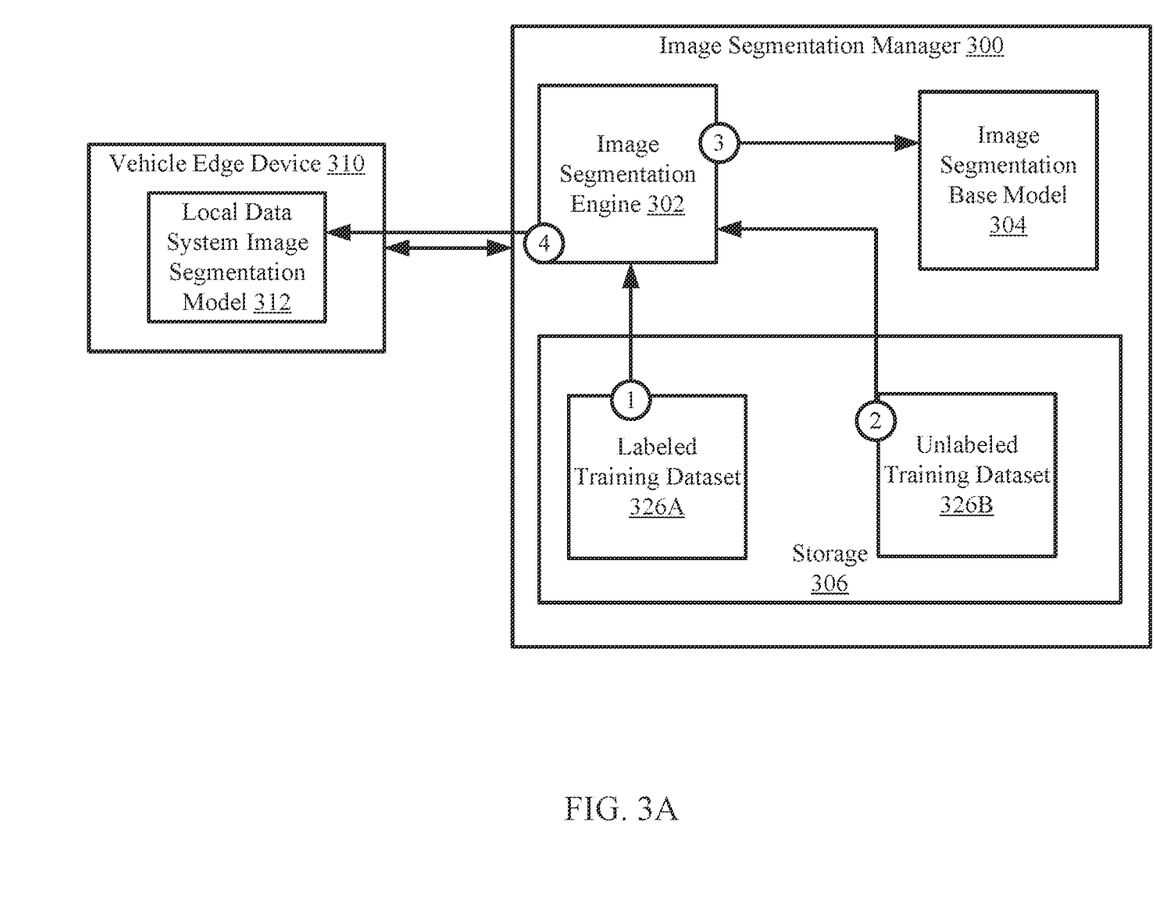
FIGS. 3A-3C show examples in accordance with one or more embodiments of the invention.
Figure 3B:
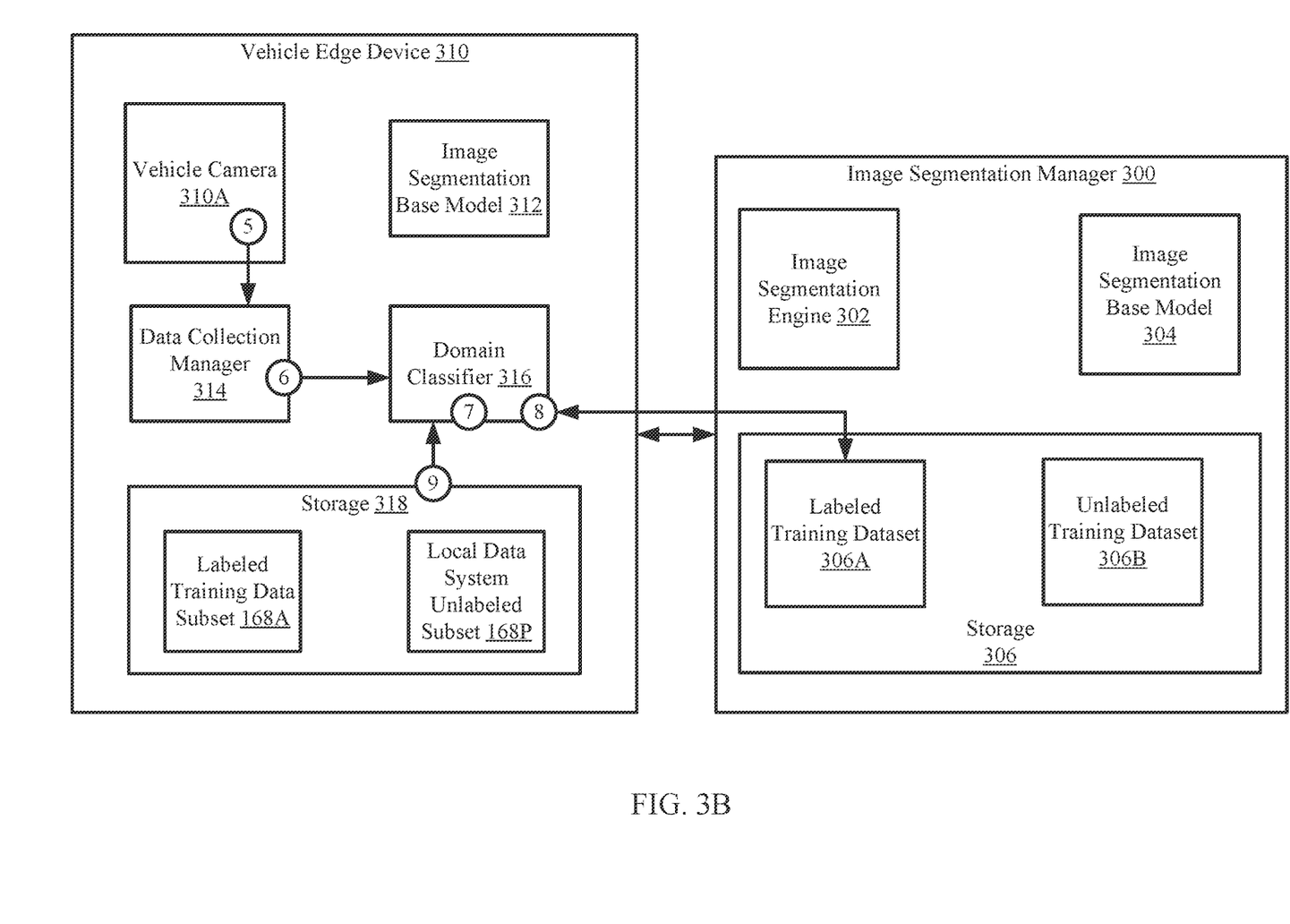
Figure 3C:
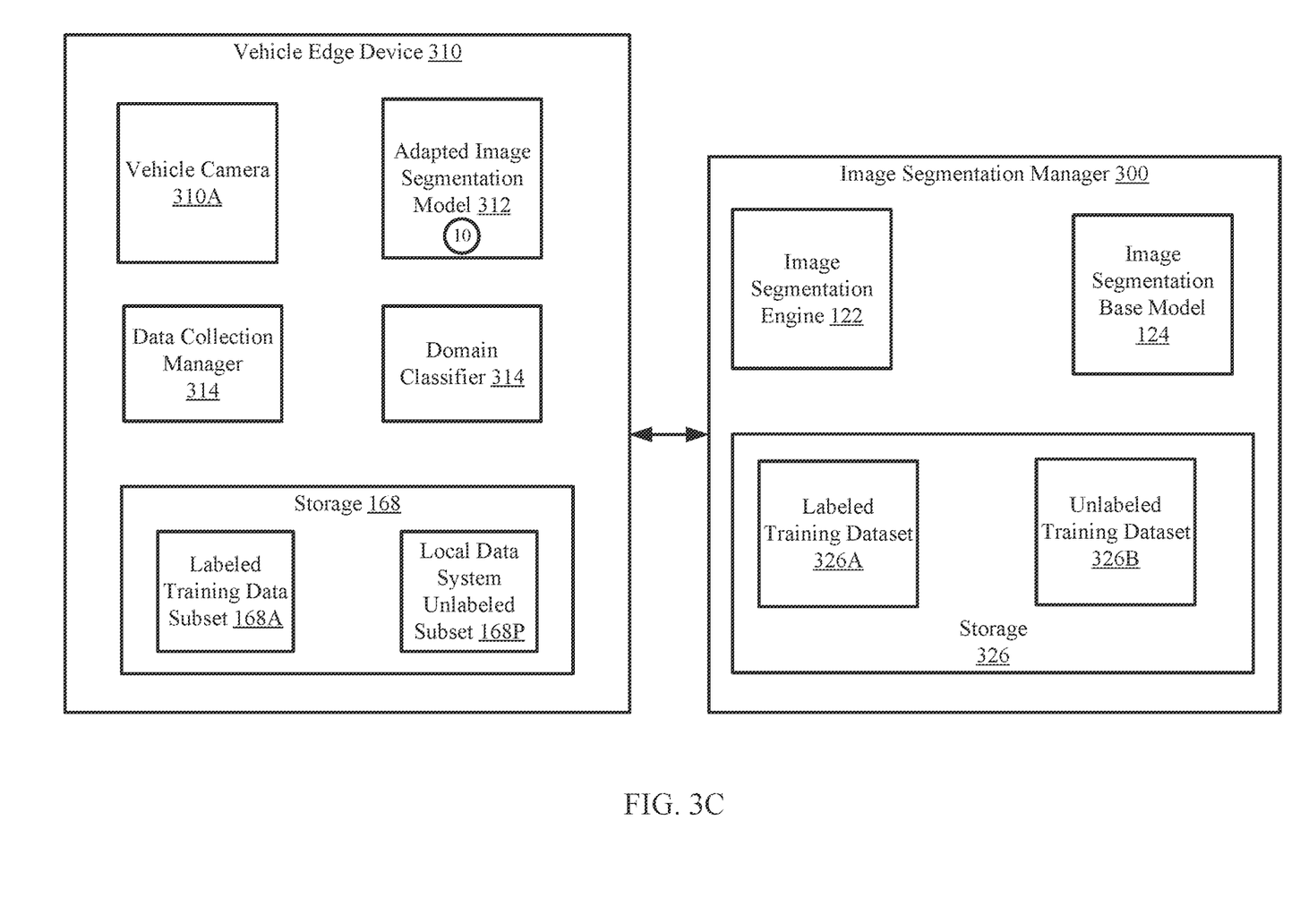

FIGS. 3A-3C, is not intended to limit the invention and is independent from any other examples discussed in this application. Turning to the example, consider a scenario in which an autonomous vehicle edge device is implementing an image segmentation model while driving.

FIG. 3A shows an example system in accordance with one or more embodiments of the invention. For the sake of brevity, not all components of the example system may be illustrated. The example system includes a vehicle edge device (310) (also referred to as "vehicle") and an image segmentation manager (300).

At a first point in time, an image segmentation engine (302) obtains the labeled training dataset (326A) [1]. Further, the unlabeled training dataset (326B) is obtained [2]. A convolutional neural network (CNN) is applied on the labeled training dataset (326A) and the unlabeled training dataset (326B) to obtain an image segmentation base model (304). The image segmentation manager (300) stores the base model (304) in the cloud service executing the image segmentation manager (300) [3]. Further, the image segmentation manager (300) deploys the image segmentation base model to the vehicle edge device (310) [4]. The vehicle edge device (310) stores the model as a local data system image segmentation model (312).

As shown in FIG. 3B, the vehicle edge device (310) includes a video camera (310A) that captures images of the surroundings of the vehicle while driving. The images are to be processed using the image segmentation base model (312) deployed in FIG. 3A to be used to make decisions while driving. As the vehicle edge device operates, the location in which the vehicle (310) drives outside of the city into a rural area. The rural area may impact the domain associated with the images obtained by the vehicle camera (310A).

During the operation, the video camera (310A) provides a set of images of the road in the rural area to the data collection manager (314) [5]. The data collection manager (314) provides the images to the domain classifier (316) [6]. The domain classifier (316) performs the method of FIG. 2B to determine that the domain of the images have significantly varied from the domain of the labeled training data subset (168A) partially used to generate the image segmentation base model (312) [7]. Based on this determination, the domain classifier (316) performs a domain adaptation in accordance with FIG. 2B. Specifically, the domain classifier (316) obtains a second portion of labeled training dataset (306A) to be used for an adaption procedure performed on the image segmentation base model (312) [8]. Further, the domain classifier (316) obtains the recent set of images from the storage (318) in the vehicle (310) to be used during the adaptation procedure [9].

FIG. 3C shows the system at a later point in time. At this point in time, the vehicle edge device (310) generates the adapted image segmentation model (312) [10]. The vehicle edge device (310) now operates using the adapted image segmentation model (312) in the new rural environment.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention distribute the load of adapting an image segmentation model generated using a neural network machine learning algorithm to a device implementing such image segmentation model. Specifically, embodiments of the invention enables a vehicle edge device, which may be operating autonomously, to adapt to new environments by updating the model used to detect objects from images. By updating using a DANN machine learning algorithm, less computation time is taken to perform the adaptation than a conventional neural network algorithm, thus reducing latency during the adaptation process.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing local data systems, the method comprising:
obtaining, by a local data system manager of a local data system of the local data systems, a portion of unlabeled data from a local data source;

performing, using a domain classifier in the local data system manager, a domain classification analysis on the portion of the unlabeled data to identify a domain of the unlabeled data;
making a first determination, based on the domain classification, that the domain classification has significantly varied from a previous domain;
based on the first determination:
performing an adaptive procedure on a local data system image segmentation model to obtain an adapted image segmentation model; and
performing a domain reclassification on the domain classifier to obtain an updated domain classifier; and
implementing the adapted image segmentation model on the local data system.

2. The method of claim 1, wherein the local data system is an autonomous vehicle edge device.

3. The method of claim 1, wherein the portion of the unlabeled data is a set of unlabeled images.

4. The method of claim 1, wherein the local data system image segmentation model is obtained from an image segmentation manager.

5. The method of claim 4, wherein the image segmentation manager is a cloud-based service.

6. The method of claim 4, wherein performing the adaptive procedure comprises:
obtaining a portion of a labeled training dataset from the image segmentation manager;
dividing the portion of the labeled training dataset to obtain groups of labeled data;
dividing the portion of unlabeled data to obtain groups of unlabeled data;
implementing a machine learning algorithm on the groups of labeled data and the groups of unlabeled data using the local data system image segmentation model to obtain the adapted image segmentation model.

7. The method of claim 6,
wherein the machine learning algorithm is a domain adaptation neural network (DANN),
wherein the local data system image segmentation model is generated using a convolutional neural network (CNN), and
wherein the DANN comprises:
determining a decay ratio; and
optimizing a number of layers in an extraction phase of a neural network using the decay ratio.

8. A non-transitory computer readable medium comprising computer readable program code, which when executed by a computer processor enables the computer processor to perform a method for managing local data systems, the method comprising:
obtaining, by a local data system manager of a local data system of the local data systems, a portion of unlabeled data from a local data source;
performing, using a domain classifier in the local data system manager, a domain classification analysis on the portion of the unlabeled data to identify a domain of the unlabeled data;
making a first determination, based on the domain classification, that the domain classification has significantly varied from a previous domain;
based on the first determination:
performing an adaptive procedure on a local data system image segmentation model to obtain an adapted image segmentation model; and
performing a domain reclassification on the domain classifier to obtain an updated domain classifier; and
implementing the adapted image segmentation model on the local data system.

9. The non-transitory computer readable medium of claim 8, wherein the local data system is an autonomous vehicle edge device.

10. The non-transitory computer readable medium of claim 8, wherein the portion of the unlabeled data is a set of unlabeled images.

11. The non-transitory computer readable medium of claim 8, wherein the local data system image segmentation model is obtained from an image segmentation manager.

12. The non-transitory computer readable medium of claim 11, wherein the image segmentation manager is a cloud-based service.

13. The non-transitory computer readable medium of claim 11, wherein performing the adaptive procedure comprises:
obtaining a portion of a labeled training dataset from the image segmentation manager;
dividing the portion of the labeled training dataset to obtain groups of labeled data;
dividing the portion of unlabeled data to obtain groups of unlabeled data; and
implementing a machine learning algorithm on the groups of labeled data and the groups of unlabeled data using the local data system image segmentation model to obtain the adapted image segmentation model.

14. The non-transitory computer readable medium of claim 13,
wherein the machine learning algorithm is a domain adaptation neural network (DANN),
wherein the local data system image segmentation model is generated using a convolutional neural network (CNN), and
wherein the DANN comprises:
determining a decay ratio; and
optimizing a number of layers in an extraction phase of a neural network using the decay ratio.

15. A system comprising:
an image segmentation manager comprising circuitry;
a local data system comprising a processor; and
memory including instructions, which when executed by the processor, perform a method comprising:
obtaining, by a local data system manager of the local data system, a portion of unlabeled data from a local data source;
performing, using a domain classifier in the local data system manager, a domain classification analysis on the portion of the unlabeled data to identify a domain of the unlabeled data;
making a first determination, based on the domain classification, that the domain classification has significantly varied from a previous domain;
based on the first determination:
performing an adaptive procedure on a local data system image segmentation model to obtain an adapted image segmentation model; and
performing a domain reclassification on the domain classifier to obtain an updated domain classifier; and
implementing the adapted image segmentation model on the local data system.

16. The system of claim 15, wherein the local data system is an autonomous vehicle edge device.

17. The system of claim 15, wherein the portion of the unlabeled data is a set of unlabeled images.

18. The system of claim 15, wherein the local data system image segmentation model is obtained from the image segmentation manager.

19. The system of claim 18, wherein the image segmentation manager is a cloud-based service.

20. The system of claim 18, wherein performing the adaptive procedure comprises:
- obtaining a portion of a labeled training dataset from the image segmentation manager;
- dividing the portion of the labeled training dataset to obtain groups of labeled data;
- dividing the portion of unlabeled data to obtain groups of unlabeled data; and
- implementing a machine learning algorithm on the groups of labeled data and the groups of unlabeled data using the local data system image segmentation model to obtain the adapted image segmentation model.

* * * * *